Nov. 16, 1965  W. W. MEYER ETAL  3,217,794
ROTARY JOINT AND DRUM
Filed Oct. 14, 1963  3 Sheets-Sheet 1

INVENTOR.
WALTER WILLIAM MEYER
WILLIAM M. TELLER
BY
William Frederick Werner
ATTORNEY INVENTOR.
WALTER WILLIAM MEYER
WILLIAM M. TELLER
BY William Frederick Werner
ATTORNEY Nov. 16, 1965  W. W. MEYER ETAL  3,217,794
ROTARY JOINT AND DRUM
Filed Oct. 14, 1963  3 Sheets-Sheet 3
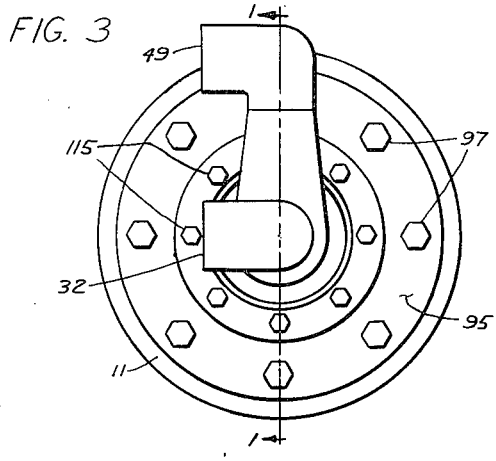
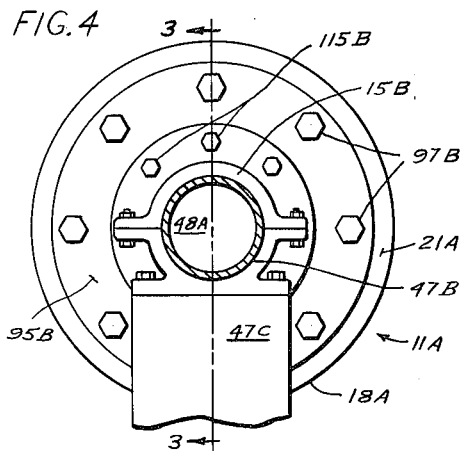
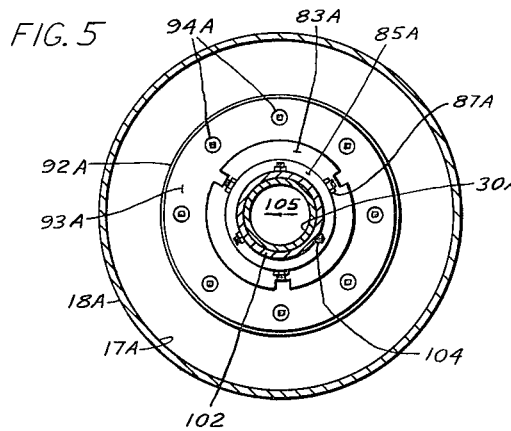
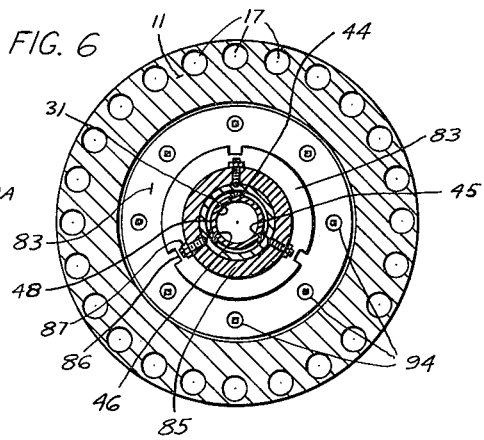
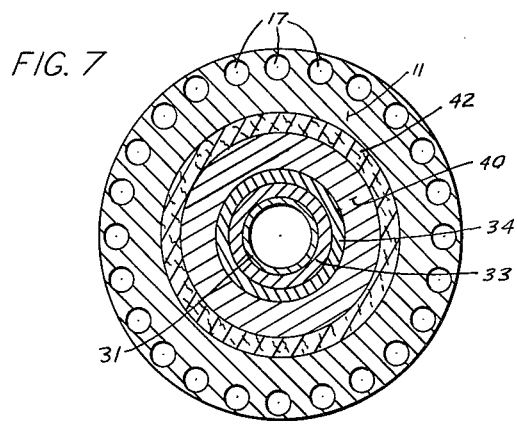
INVENTOR.
WALTER WILLIAM MEYER
BY WILLIAM M. TELLER
William Frederick Werner
ATTORNEY United States Patent Office 3,217,794
Patented Nov. 16, 1965

3,217,794
ROTARY JOINT AND DRUM
Walter W. Meyer, Warwick, R.I., and William M. Teller, Pleasantville, N.Y., assignors to Sealol, Inc., Warwick, R.I., a corporation of Delaware
Filed Oct. 14, 1963, Ser. No. 315,907
7 Claims. (Cl. 165—89)

This invention relates to a rotary joint and more particularly to a rotary joint housed within a drum.

An object of the present invention is to provide a high speed, high temperature rotary joint housed within a rotating drum, whereby the floor space requirement for the drum and rotary joint is combined into a compact space.

Another object of the present invention is to locate a rotary joint within a rotating drum so that leakage from the rotary joint will harmlessly occur within the rotating drum.

Another object of the present invention is to provide a rotating drum with a stationary pipe connection through the medium of a rotary joint, whereby fluid passing through the stationary pipe will influence and control the surface temperature of the drum.

The present invention is particularly adapted for use in machinery wherein, paper, cloth, plastic film, linoleum, etc., is processed by means of surface contact with a rotating drum whose surface temperature is part of the processing operation.

In prior art constructions where the rotary joint was along side the drum, production stopped the instant a rotary joint sprung a leak. With the present invention, production may continue until a convenient time in the production schedule is arrived at, to repair the leak in the rotary joint because the leaking fluid is absorbed by the fluid flowing through the drum.

Other objects of the present invention will become apparent in part and be pointed out in part in the following specification and claims.

Reference is now made to the drawings wherein similar characters of reference refer to like parts and wherein:

FIGURE 3 is a left hand end view of FIGURE 1.

FIGURE 4 is a right hand end view taken on line 4—4 of FIGURE 2.

FIGURE 5 is a vertical cross sectional view taken on line 5—5 of FIGURE 2, looking in the direction of the arrows.

FIGURE 6 is a transverse cross sectional view taken on line 6—6 of FIGURE 1, looking in the direction of the arrows.

FIGURE 7 is a view similar to FIGURE 6, taken on line 7—7 of FIGURE 1, looking in the direction of the arrows.

Figure 1:
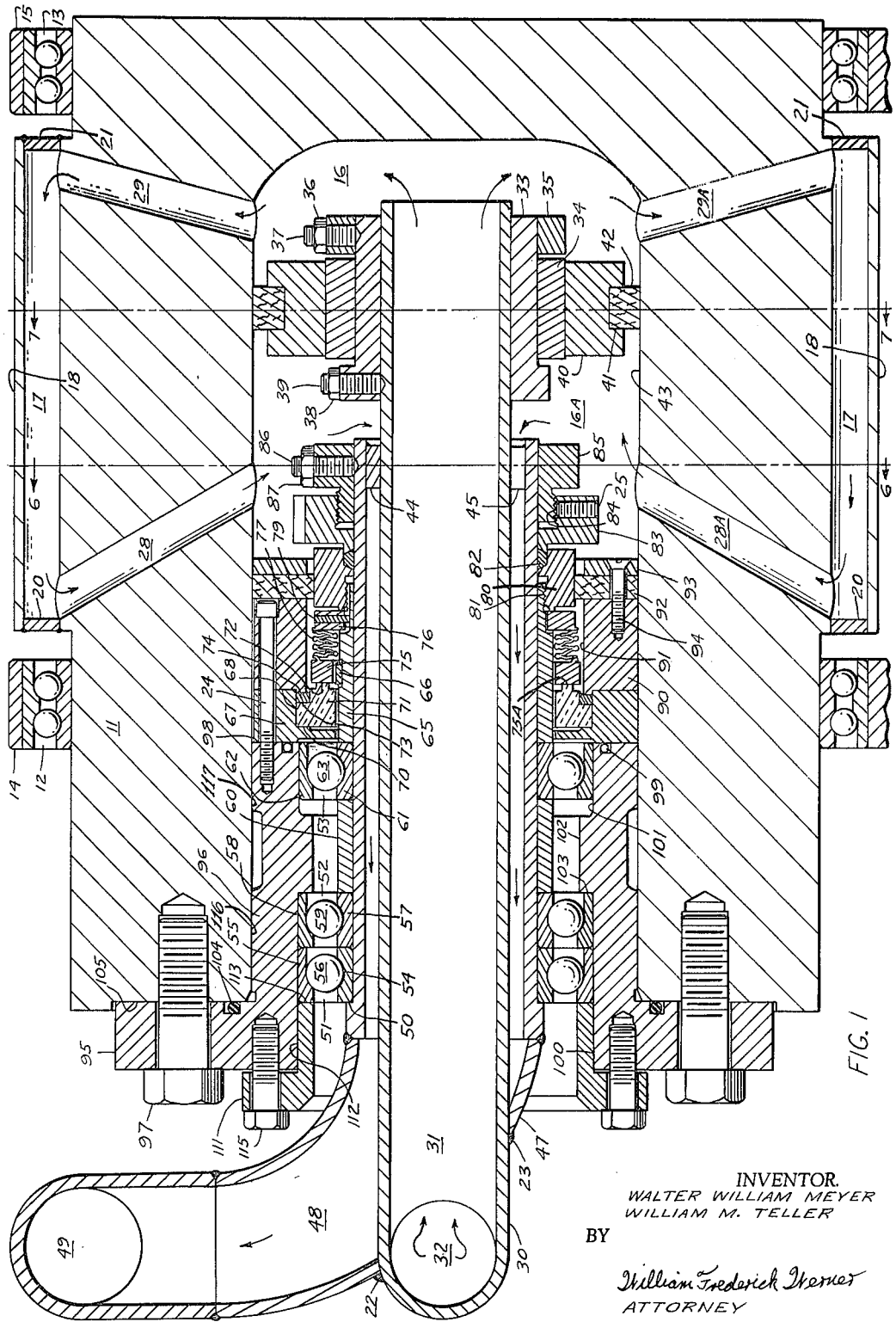
FIGURE 1 is a vertical cross sectional view through the new and improved rotary joint and drum as indicated on line 1—1 of FIGURE 3.

In proceeding with this invention and with particular reference to FIGURE 1, there is provided a rotating drum 11 supported in anti-friction bearings 12 and 13 which are housed, respectively, in bearing retainers 14 and 15. Drum 11 is provided with an axial cavity 16 and a plurality of longitudinal fluid passageways 17 which have the opposite ends stopped by means of plugs 20, 21, respectively. A plurality of ports 28, 28A and 29, 29A, connect cavity 16 with longitudinal fluid passageways 17, thereby providing drum 11 with a temperature (hot or cold) transfer surface 18.

An inlet pipe 30 provided with an inlet passageway 31 and an entrance 32 is supported in cavity 16 by means of a bearing block 33. A bearing 34 is rotatively mounted upon bearing block 33. A bearing retainer 35 is fastened to bearing block 33 by means of nut 36 and screw 37 combination. A second nut 38 and screw 39 combination fastens bearing block 33 to inlet pipe 30. A bearing housing 40 provided with a groove 41 is fastened to bearing 34 by means of a drive fit. An asbestos packing 42 is located in groove 41 and engages the wall 43 which defines cavity 16. A spider collar comprises three lugs 44, 45, 46 fastened to inlet pipe 30 by means of welding. An outlet pipe 47 provided with an outlet passageway 48 and an exit 49 partly surrounds inlet pipe 30 and is fastened to lugs 44, 45 and 46. A shoulder 50 is formed in outlet pipe 47.

Three anti-friction or ball bearings 51, 52 and 53 are provided. Bearing 51 consists of an inner race 54 abutting shoulder 50 and located upon outlet pipe 47, an outer race 55 and balls 56 between inner race 54 and outer race 55. Anti-friction bearing 52 consists of inner race 57 located upon outlet pipe 47 abutting anti-friction bearing 51, an outer race 58 and balls 59. A spacing collar 60 is located upon outlet pipe 47 abutting inner race 57 on one end. Ball bearing 53 consists of inner race 61 abutting spacing collar 60, outer race 62 and balls 63.

A sleeve 65 provided with a key 66 is slidably mounted upon outlet pipe 47 with one end abutting inner race 61. A mating ring adapter 67 is rotatively mounted upon sleeve 65 and is provided with a circular recess 68 having a back wall 70. A mating ring 71 provided with a sealing face 72 and a circular groove 73 is rotatively mounted upon sleeve 65 and is located in circular recess 68 abutting back wall 70. A gasket 74 is located in circular groove 73. A compressible metallic bellows is provided consisting of mating face 75, a static ring 76 and a plurality of accordion-like metal diaphragms 77 which are fastened on opposite ends to the mating face 75 and static ring 76, respectively. Key 66 fastens mating face 75 to sleeve 65 with mating face 75 engaging sealing face 72. A set screw 79 fastens static ring 76 to sleeve 65. A clamping ring 80 provided with screw threads 81 and a shaft packing 82 is rotatively mounted upon sleeve 65 through screw threads 81 and companion screw threads on sleeve 65. A locking nut 83 provided with screw threads 84 is rotatively mounted upon outlet pipe 47 abutting shaft packing 82. A holding collar 85 is rotatively mounted upon outlet pipe 47 and through screw threads which mate with screw threads 84 rotatively engages locking nut 83. A set screw 86 provided with a nut 87 is rotatively mounted in holding collar 85 and is fastened in outlet pipe 47. A set screw 25 is provided in locking nut 83 to fasten locking nut 83 to holding collar 85. In this manner the anti-friction bearings 51, 52, 53, spacing collar 60, sleeve 65, mating face 75, static ring 76, diaphragms 77, clamping ring 80, shaft packing 82, locking nut 83 and holding collar 85 in cooperation with shoulder 50, are held on outlet pipe 47.

A back-up block 90 provided with a cavity 91 is positioned against mating ring adapter 67 abutting gasket 74. A dirt excluding ring 92 surrounds clamping ring 80. A retaining ring 93 forces dirt excluding ring 92 against back-up block 90 and is secured in position by means of screws 94 which fastens in back-up block 90.

A housing provided with a flange 95 and a circular projection 96 is fastened to drum 11 by means of bolts 97 with circular projection 96 slidingly engaging wall 43 and with end 98 abutting mating ring adapter 67. An "O" ring 99 is provided between end 98 and mating ring adapter 67. Circular projection 96 is provided with two inner surfaces 100 and 101 separated by a projection 102 having a shoulder 103. Surface 101 engages outer race 62 with a sliding fit. Surface 100 engages outer races 55 and 58 with a drive fit. Shoulder 103 abuts outer race 58.

An "O" ring 104 located in a groove in flange 95 engages end 105 of drum 11 to provide a fluid tight seal.

A cover provided with a flange 111 and a circular projection 112 slidingly engages surface 100 with the end 113 of circular projection 112 abutting outer race 55. Flange 111 is fastened to flange 95 by means of bolts 115. Bolts 24 secure back-up block 90 and mating ring adapter 67 to circular projection 96. Inlet pipe 31 is fastened to outlet pipe 47 by means of welding as indicated at 22 and 23.

It will be noted that anti-friction bearings 51, 52, 53 support circular projection 96 which is fastened to drum 11 through flange 95 and surfaces 116, 117 and therefore the bearings 51, 52, 53 support outlet pipe 47 in its non-rotational function while drum 11 rotates.

In operation fluid under pressure processed as to temperature, viz, hot or cold, will flow from entrance 32, through inlet pipe 31 to axial cavity 16 where it will flow through ports 29, 29A, etc., into longitudinal fluid passageways 17. In longitudinal fluid passageways 17 temperature exchange takes place as the flowing fluid influences surface 18.

Asbestos packing 42 divides axial cavity into two sections. Fluid entering cavity 16 and fluid exiting cavity 16A.

The fluid in longitudinal fluid passageways 17 will exit through ports 28, 28A, into fluid exiting cavity 16A and past the spider collars 44, 45, 46, into outlet passageway 48 to exit 49.

It will be observed that drum 11, asbestos packing 42, bearing housing 40, and bearing 34 rotate on bearing block 33. And that drum 11 along with flange 95, circular projection 96, flange 111, circular projection 112, outer races 55, 58, 62 mating ring adapter 67, back-up block 90, ring 92, retaining ring 93, mating ring 71 and gasket 74 rotate upon outlet pipe 47.

The stationary elements are inlet pipe 30, bearing block 33, spider collars 44, 45, 46, outlet pipe 47, inner races 54, 57, 61, spacing collar 60, sleeve 65, key 66, mating face 75, static ring 76, metal diaphragms 77, clamping ring 80, shaft packing 82, locking nut 83, and holding collar 85.

If the fluid in cavity 16 bypasses asbestos packing 42 and flows into exit cavity 16A, no harm results to the operation of the rotating drum.

Shaft packing 82, gasket 74, "O" rings 99 and 104 along with the engagement of rotating sealing face 72 with stationary mating face 75, combine to retain the fluid in exit cavity 16A so that the fluid will exit through outlet passageway 48.

Thus it will be seen, that a rotating drum 11 having a temperature transfer surface 18 is provided with a rotary joint housed almost entirely within the rotating drum 11. A rotary joint is a type of rotary fluid seal.

Figure 2:
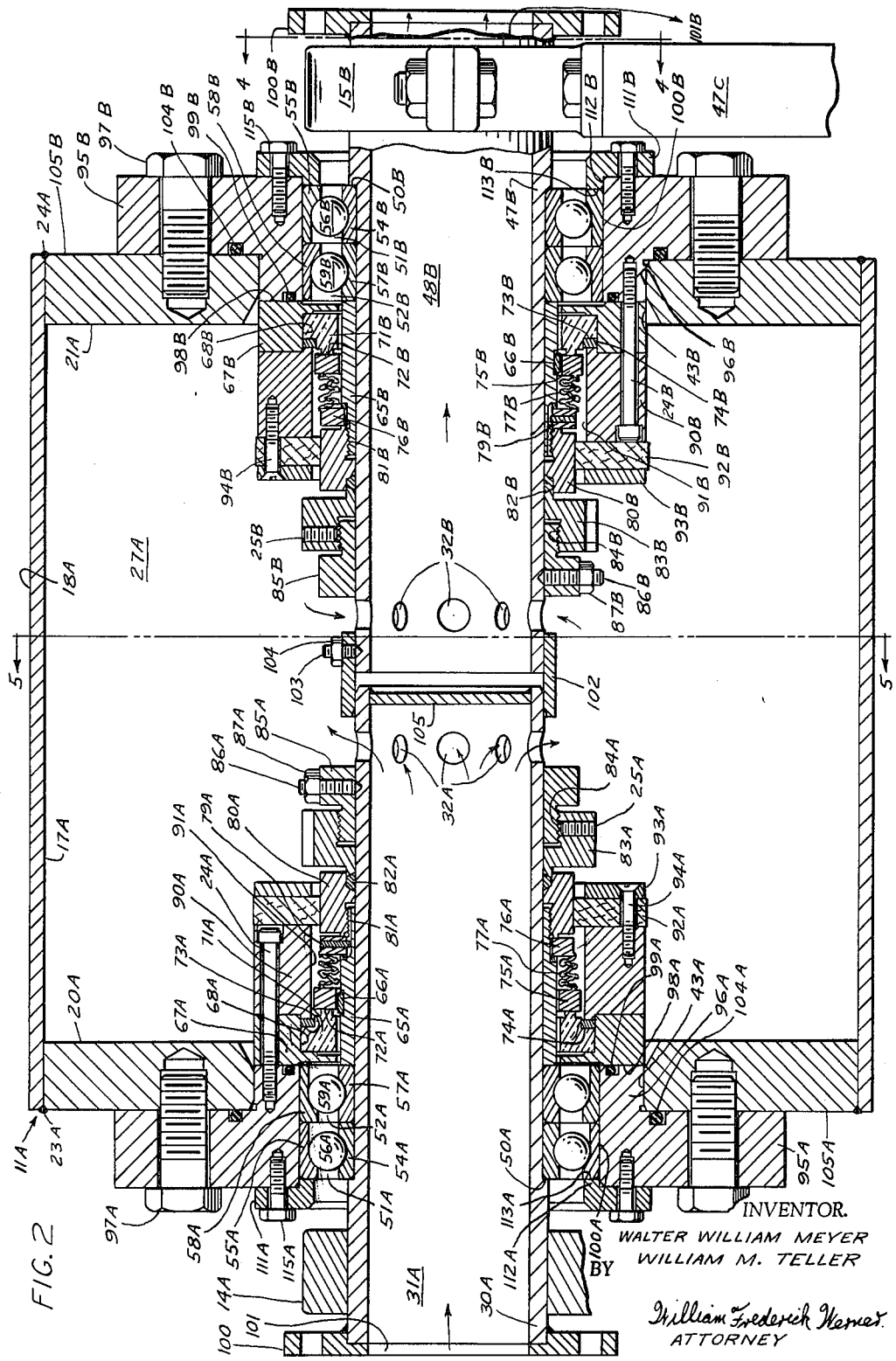
FIGURE 2 is a view similar to FIGURE 1 illustrating a modified form of rotary joint and drum construction.

In the modified form of construction illustrated in FIGURE 2, an inlet pipe 30A is provided with an inlet passageway 31A, inlet ports 32A and a shoulder 50A. A side flange 100 having an axial orifice 101 aligned with inlet passageway 31A is adapted to be secured to a supply pipe (not shown). A support 14A surrounds inlet pipe 30A.

An outlet pipe 47B is provided with outlet passageway 48B, outlet ports 32B, and a shoulder 50B. A side flange 100B having an axial orifice 101B aligned with outlet passageway 48B is adapted to be secured to a discharge pipe (not shown). A support 15B surrounds outlet pipe 47B and may be provided with a supporting leg 47C.

A collar joint 102 overlies and supports the ends of inlet pipe 30A and outlet pipe 47B. A set screw 103 provided with a lock nut 104 is rotatively mounted in collar joint 102 and is fastened to outlet pipe 47B. Inlet pipe 30A is provided with a disk plug 105 which blocks one end of inlet passageway 31A.

A rotating drum, generally indicated by reference numeral 11A, is fabricated from a band 17A fastened to collars 20A and 21A by means of welding at 23A and 24A, respectively. Band 17A is provided with a heat or temperature transfer surface 18A. As will presently appear, band 17A and collars 20A and 21A provide a chamber 27A in communication with inlet ports 32A and outlet ports 32B.

The mechanism supported upon inlet pipe 30A will first be described; followed by a description of the mechanism supported upon outlet pipe 47B.

Two anti-friction bearings 51A, 52A are provided. Bearing 51A consists of an inner race 54A abutting shoulder 50A, an outer race 55A and balls 56A between inner race 54A and outer race 55A. Anti-friction bearing 52A consists of inner race 57A located upon inlet pipe 30A abutting anti-friction bearing 51A, an outer race 58A and balls 59A. A sleeve 65A provided with a key 66A is slidably mounted upon inlet pipe 30A with one end abutting inner face 57A. A mating ring adapter 67A is rotatively mounted upon sleeve 65A and is provided with a circular recess 68A. A mating ring 71A provided with a sealing face 72A and a circular groove 73A is rotatively mounted upon sleeve 65A and is located in circular recess 68A. A gasket 74A is located in circular groove 73A. A compressible metallic bellows is provided consisting of mating face 75A, a static ring 76A and a plurality of accordion like metal diaphragms 77A which are fastened on opposite ends to the mating face 75A and static ring 76A, respectively. Key 66A fastens mating face 75A to sleeve 65A with mating face 75A engaging sealing face 72A. A set screw 79A fastens static ring 76A to sleeve 65A. A clamping ring 80A provided with screw threads 81A and a shaft packing 82A is rotatively mounted upon sleeve 65A through screw threads 81A and companion screw threads on sleeve 65A. A locking nut 83A provided with screw threads 84A is rotatively mounted upon inlet pipe 30A abutting shaft packing 82A. A holding collar 85A is rotatively mounted upon inlet pipe 30A and through screw threads which mate with threads 84A, rotatively engages locking nut 83A. A set screw 86A provided with a nut 87A is rotatively mounted in holding collar 85A and is fastened in inlet pipe 30A. A set screw 25A is provided in locking nut 83A to fasten locking nut 83A to holding collar 85A. In this manner the anti-friction bearings 51A, 52A, sleeve 65A, mating face 75A, static ring 76A, diaphragms 77A, clamping ring 80A, shaft packing 82A, locking nut 83A and holding collar 85A in cooperation with shoulder 50A are held on inlet pipe 30A.

A housing provided with a flange 95A and a circular projection 96A is fastened to collar 20A by means of bolts 97A with circular projection 96A slidingly engaging wall 43A and with end 98A abutting mating ring adapter 67A. An "O" ring 99A is provided between end 98A and mating ring adapter 67A. Circular projection 96A is provided with surface 100A which engages outer races 55A and 58A with a drive fit. An "O" ring 104A located in a groove in flange 95A engages end 105A of collar 20A to provide a fluid tight seal.

A cover provided with a flange 111A and a circular projection 112A slidingly engages surface 100A with the end 113A abutting outer race 55A. Flange 111A is fastened to flange 95A by means of bolts 115A.

A back-up block 90A provided with a cavity 91A is positioned against mating ring adapter 67A abutting gasket 74A. A dirt excluding ring 92A surrounds clamping ring 80A. A retaining ring 93A forces dirt excluding ring 92A against back-up block 90A and is secured in position by means of screws 94A which fasten in back-up block 90A. Bolts 24A secure back-up block 90A and mating ring adapter 67A to circular projection 96A.

Two anti-friction bearings 51B, 52B are provided. Bearing 51B consists of an inner race 54B abutting shoulder 50B, an outer race 55B and balls 56B between inner race 54B and outer race 55B. Anti-friction bearing 52B consists of inner race 57B located upon outlet pipe 47B abutting anti-friction bearing 51B, an outer race 58B and balls 58B. A sleeve 65B provided with a key 66B in slidably mounted upon outlet pipe 47B with one end abutting inner face 57B. A mating ring adapter 67B is rotatively mounted upon sleeve 65B and is provided with a circular recess 68B. A mating ring 71B provided with a sealing face 72B and a circular groove 73B is rotatively mounted upon sleeve 65B and is located in circular recess 68B. A gasket 74B is located in circular groove 73B. A compressible metallic bellows is provided consisting of mating face 75B a static ring 76B and a plurality of accordion like metal diaphragms 77B which are fastened on opposite ends to the mating face 75B and static ring 76B, respectively. Key 66B fastens mating face 75B to sleeve 65B with mating face 75B engaging sealing face 72B. A set screw 79B fastens static ring 76B to sleeve 65B. A clamping ring 80B provided with screw threads 81B and a shaft packing 82B is rotatatively mounted upon sleeve 65B through screw threads 81B and companion screw threads on sleeve 65B. A locking nut 83B provided with screw threads 84B is rotatively mounted upon outlet pipe 47B abutting shaft packing 82B. A holding collar 85B is rotatively mounted upon outlet pipe 47B and through screw threads which mate with threads 84B, rotatively engages locking nut 83B. A set screw 86B provided with a nut 87B is rotatively mounted in holding collar 85B and is fastened in outlet pipe 47B. A set screw 25B is provided in locking nut 83B to fasten locking nut 83B to holding collar 85B. In this manner the anti-friction bearings 51B, 52B, sleeve 65B, mating face 75B, static ring 76B, diaphragms 77B, clamping ring 80B, shaft packing 82B, locking nut 83B and holding collar 85B in cooperation with shoulder 50B are held on outlet pipe 47B.

A housing provided with a flange 95B and a circular projection 96B is fastened to collar 21B by means of bolts 97B with circular projection 96B slidingly engaging wall 43B and with end 98B abutting mating ring adapter 67B. An "O" ring 99B is provided between end 98B and mating ring adapter 67B. Circular projection 96B is provided with surface 100B which engages outer races 55B and 58B with a drive fit. An "O" ring 104B located in a groove in flange 95B engages end 105B of collar 21A to provide a fluid tight seal.

A cover provided with a flange 11B and a circular projection 112B slidingly engages surface 100 with the end 113B abutting outer race 55B. Flange 111B is fastened to flange 95B by means of bolts 115B.

A back-up block 90B provided with a cavity 91B is positioned against mating ring adapter 67B abutting gasket 74B. A dirt excluding ring 92B surrounds clamping ring 80B. A retaining ring 93B forces dirt excluding ring 92B against back-up block 90B and is secured in position by means of screws 94B which fasten in back-up.

Having shown and described preferred embodiments of the present invention, by way of example, it should be realized that structural changes could be made and other examples given without departing from either the spirit or scope of this invention.

What we claim is:

1. A rotary joint and drum consisting of a rotatable drum having a temperature transfer surface, a wall defining an axial cavity and a plurality of longitudinal fluid passageways, a plurality of ports constituting conduits between said axial cavity and said plurality of longitudinal fluid passageways, an inlet pipe having an entrance and an inlet passageway, said inlet pipe located within said axial cavity, a bearing block fixed to said inlet pipe, a bearing rotatively mounted upon said bearing block, a bearing housing fastened to said bearing block, a packing fastened to said bearing housing and engaging said wall to divide said axial cavity into two sections, a spider collar comprising three lugs fastened to said inlet pipe, an outlet pipe positioned over said inlet pipe to provide an outlet passageway therebetween, said outlet pipe on one end fastened to said three lugs, said outlet pipe having an exit, said inlet passageway leading to one of said two sections and through some of said ports to said longitudinal fluid passageways, and other of said ports leading from said longitudinal passageways to the other of said two sections and to said outlet passageway, a housing provided with a flange, a circular projection and an inner surface, said circular projection engaging said wall, means fastening said flange to said rotatable drum, bearing means interposed between said outlet pipe and said inner surface to rotatably connect said housing with said outlet pipe, a sleeve provided with a key located upon said outlet pipe, a mating ring adapter provided with a circular recess having a back wall rotatively mounted upon said sleeve, a mating ring provided with a sealing face and a circular groove located in said circular recess and abuttting said back wall, a gasket in said circular groove, a back-up ring provided with a cavity located against said mating ring and gasket, means fastening said back-up block and said mating ring adapter to said housing, a clamping ring, means fastening said clamping ring to said sleeve in fluid tight relationship, and an expansible bellows provided with a static ring on one end and fastened to said sleeve and mating face having a mating surface fastened to the other end of said expansible bellows with said mating surface engaging said sealing face in fluid tight relationship whereby a fluid seal exists between the rotating drum and its rotating elements and the stationary inlet and outlet pipe and the other stationary elements fastened thereto.

2. A rotary joint and drum consisting of a rotatable drum having a temperature transfer surface, a wall defining an axial cavity and port means providing fluid passageways from said axial cavity to said temperature transfer surface, an inlet pipe having an entrance and an inlet passageway with a major portion of its length located within said axial cavity, said inlet passageway in communication with said cavity, an outlet pipe having an exit, positioned over said inlet pipe to provide an outlet passageway, said outlet passageway in communication with said cavity, means dividing said cavity into an inlet fluid section and an outlet fluid section, therebetween, means on said inlet pipe supporting said outlet pipe, a housing provided with a circular projection and an inner surface, said circular projection engaging said wall, means fastening said housing to said rotatable drum, bearing means interposed between said outlet pipe and said inner surface to rotatably connect said housing with said outlet pipe, a mating ring adapter rotatively mounted upon said outlet pipe, a mating ring adapter rotatively mounted upon said outlet pipe, a mating ring provided with a sealing face, means securing said mating ring to said mating ring adapter, a back-up block provided wiht a cavity, located against said mating ring with said cavity surrounding said outlet pipe, means fastening said back-up block and said mating ring adapter to said housing, and an expansible bellows provided with a static ring on one end and a mating face having a mating surface on the other end, means fastening said static ring to said outlet pipe, said mating surface yieldingly engaging said sealing face in fluid tight relationship to provide a fluid seal in said outlet fluid section.

3. A rotary joint and drum consisting of a rotatable drum having a temperature transfer surface, and a wall defining an axial cavity, a stationary inlet pipe, a stationary outlet pipe surrounding said stationary inlet pipe to provide an outlet passageway therebetween, said inlet and outlet pipes having a major portion of their lengths contained within said cavity, means dividing said cavity into a fluid inlet section and a fluid outlet section, said inlet pipe having an inlet passageway in communication with said fluid inlet section, said outlet passageway in communication with said fluid outlet section and means in said drum for the passage of fluid from said fluid inlet section to said fluid outlet section whereby said temperature transfer surface becomes temperature influenced by the passage of fluid from said fluid inlet section to said fluid outlet section, a housing provided with a circular projection and an inner surface, said circular projection engaging said wall, means fastening said housing to said rotatable drum, bearing means interposed between said stationary outlet pipe and said inner surface to rotatably connect said housing with said stationary outlet pipe, a mating ring adapter rotatively mounted around said stationary outlet pipe, a mating ring provided with a sealing face, means securing said mating ring to said mating ring adapter, a back-up block provided with a cavity, located against said mating ring with said cavity surrounding said stationary outlet pipe, means fastening said back-up block and said mating ring adapted to said housing to rotate with said housing and drum, and constituting the rotatable portion of a rotary joint and an expansible bellows provided with a static ring on one end and a mating face having a mating surface on the other end, means fastening said static ring to said stationary outlet pipe, said mating surface yieldingly engaging said sealing face in fluid tight relationship, said expansible bellows, said static ring and said mating face constituting the stationary portion of a rotary joint, said stationary portion and said rotatable portion of the rotary joint being located wholly within said cavity and providing a rotary fluid seal.

4. A rotary joint and drum consisting of a rotatable drum having a temperature transfer surface and a wall defing an axial cavity, a stationary inlet pipe, a stationary outlet pipe surrounding said stationary inlet pipe a portion of its length to provide an outlet passageway therebetween, said inlet and outlet pipes having a major portion of their lengths contained within said cavity, bearing means supporting said inlet pipe in said wall and dividing said cavity into a fluid inlet section and a fluid outlet section, said inlet pipe having an inlet passageway in communication with said fluid inlet section, said outlet passageway in communication with said fluid outlet section, and means in said drum for the passageway of fluid from said fluid inlet section to said outlet section adjacent said temperature transfer surface, a housing provided with a circular projection and an inner surface, said circular projection engaging said wall, means fastening said housing to said rotatable drum, bearing means interposed between said outlet pipe and said inner surface to rotatably connect said housing with said outlet pipe, a mating ring adapter rotatively mounted around said outlet pipe, a mating ring provided wtih a sealing face, means securing said mating ring to said mating ring adapter, a back-up block provided with a cavity, located against said mating ring adapter and mating ring with said cavity surrounding said outlet pipe, means fastening said back-up block and said mating ring adapter to said housing to rotate with said housing and drum, and constituting the rotatable portion of a rotary joint, a sleeve provided with a key located upon said outlet pipe, a clamping ring, means rotatively fastening said clamping ring to said sleeve, an expansible bellows provided with a static ring on one end and a mating face having a mating surface on the other end, means fastening said static ring to said sleeve with said mating surface yieldingly engaging said sealing face, said expansible bellows, said static ring and said mating face constituting the stationary portion of a rotary joint, said stationary portion and said rotatable portion of the rotary joint being located wholly within said cavity and providing a rotary fluid seal, a locking nut rotatively mounted upon said outlet pipe, a fluid packing, said locking nut forcing said fluid packing against said clamping ring and said outlet pipe to provide a fluid tight seal, a holding collar rotatively mounted upon said outlet pipe, means rotatively connecting said holding collar to said locking nut to fasten said locking nut in selected position, and means fastening said holding collar to said outlet pipe, a dirt excluding ring and a retaining ring, and means fastening said retaining ring and dirt excluding ring to said back-up block with said dirt excluding ring engaging said wall and said clamping ring.

5. A rotary joint and drum consisting of a rotatable drum having a temperature transfer surface, a wall defining an axial cavity, and port means providing fluid passageways from said axial cavity to said temperature transfer surface, an inlet pipe having an inlet passageway with a major portion of the length located within said axial cavity, an outlet pipe positioned co-axially over said inlet pipe to provide an outlet passageway therebetween, said outlet passageway in communication with said cavity, means dividing said cavity into an inlet fluid section and an outlet fluid section, a housing provided with a circular projection and an inner surface, said circular projection engaging said wall, means fastening said housing to said rotatable drum, bearing means interposed between said outlet pipe and said inner surface to rotatably connect said housing with said outlet pipe, a mating ring adapter rotatively mounted around said outlet pipe, a rotary joint fluid sealing means comprising a mating ring having a sealing face, means fastening said mating ring to said mating ring adapter, means fastening said mating ring adapter to said housing to unite said sealing face with said rotating drum, and a stationary mating face having a mating surface, means slidably mounting said mating face to said outlet pipe, a static ring fastened to said outlet pipe, and resilient means interposed between said static ring and mating face to yieldingly force said mating surface into fluid tight engagement with said sealing face to provide a fluid seal in said fluid outlet section of said cavity.

6. A rotary joint and drum consisting of a rotatable drum having a temperature transfer surface and a first and second oppositely located collar, defining an axial cavity, an inlet pipe having an inlet passageway, an outlet pipe having an outlet passageway joined in end to end relation with said inlet pipe and located within said drum and coaxially therewith, each pipe extending from said drum at respective opposite ends, fluid port means at the adjacent ends of said pipes between the passageways in said pipes and said axial cavity, a first housing provided with a first circular projection and a first inner surface, a second housing provided with a second circular projection and a second inner surface, means fastening said first housing to said first collar, means fastening said second housing to said second collar, a first bearing means interposed between said inlet pipe and said first inner surface, a second bearing means interposed between said outlet pipe and said second inner surface, a first mating ring adapter rotatively mounted around said inlet pipe, means fastening said first mating ring adapter to said first housing, a second mating ring adapter rotatively mounted around said outlet pipe, means fastening said second mating ring adapter to said second housing, a first rotary joint fluid sealing means comprising a mating ring having a sealing face, means fastening said mating ring to said first mating ring adapter, means fastening said mating ring adapter to said first housing to unite said sealing face with said rotating drum, and a stationary mating face having a mating surface, means slidably mounting said stationary mating face to said inlet pipe, a static ring fastened to said inlet pipe, and resilient means interposed between said static ring and stationary mating face to yieldingly force said mating surface into fluid tight engagement with said sealing face, and a second rotary joint fluid sealing means comprising a mating ring having a second sealing face, means fastening said mating ring to said second mating ring adapter, means fastening said mating ring adapter to said second housing to unite said second sealing face with said rotating drum, and a second stationary mating face having a second mating surface, means slidably mounting said second stationary mating face to said outlet pipe, a second static ring fastened to said outlet pipe, and a second resilient means interposed between said second static ring and second stationary mating face yieldingly force said mating surface into fluid tight engagement with said second sealing face.

7. A rotary joint and drum consisting of a rotatable drum having a temperature transfer surface and a first and second oppositely located collar, defining an axial cavity, an inlet pipe having an inlet passageway, means blocking said inlet passageway on one end, an outlet pipe having an outlet passageway joined in end to end relation with said inlet pipe and located within said drum and coaxially therewith, each pipe extending from said drum at respective opposite ends, fluid port means at the adjacent ends of said pipes between the passageways in said pipes and said axial cavity, a first housing provided with a first circular projection and a first inner surface, a second housing provided with a second circular projection and a second inner surface, means fastening said first housing to said first collar, means fastening said second housing to said second collar, a first bearing means interposed between said inlet pipe and said first inner surface, a second bearing means interposed between said outlet pipe and said second inner surface, a first sleeve surrounding said inlet pipe, a first mating ring adapter rotatively mounted around said first sleeve, a second sleeve surrounding said outlet pipe, a second mating ring adapter rotatively mounted around said second sleeve, a first rotary joint comprising a first mating ring having a first sealing face means fastening said first mating ring to said first mating ring adapter, a first back-up block rotatively mounted around said first sleeve, a dirt excluding ring and a retaining ring, both surrounding said inlet pipe, and a first means fastening said retaining ring, dirt excluding ring, and back-up block to said first housing thereby to rotate with said drum, a first expansible bellows provided with a first static ring on one end and a first mating face having a first mating surface on the other end means fastening said first static ring to said first sleeve and key means slidingly fastening said first mating face to said first sleeve with said first mating surface yieldingly engaging said first sealing face, a clamp ring rotatively mounted upon said inlet pipe and rotatively engaging said first sleeve with said dirt excluding ring engaging said clamping ring, a first locking nut, a first shaft packing, means fastening said first locking nut to said inlet pipe with said first shaft packing between said first locking nut and said first clamping ring, a second rotary joint comprising a second mating ring having a second sealing face, means fastening said second mating ring to said second mating ring adapter, a second back-up block rotatively mounted around said second sleeve, a second dirt excluding ring and a second retaining ring, both surrounding said outlet pipe, and a second means fastening said second retaining ring, said second dirt excluding ring, and said second back-up block to said second housing thereby to rotate with said drum, a second expansible bellows provided with a second static ring on one end and a second mating face having a second mating surface on the other end, means fastening said second static ring to said second sleeve, and key means slidingly fastening said second mating face to said second sleeve with said second mating surface yieldingly engaging said second sealing face, a second clamping ring rotatively mounted upon said outlet pipe and rotatively engaging said second sleeve with said second dirt excluding ring engaging said second clamping ring, a second locking nut, a second shaft packing, means fastening said second locking nut to said outlet pipe, with said second shaft packing between said second locking nut and said second clamping ring.

References Cited by the Examiner

UNITED STATES PATENTS

| | | | |
|---|---|---|---|
| 956,290 | 4/1910 | Colson. | |
| 1,897,280 | 2/1933 | Schwitzer et al. | 308—187.1 |
| 1,991,432 | 2/1935 | Valentine et al. | |
| 2,393,260 | 1/1946 | Pardee | 308—187.1 |
| 2,639,204 | 5/1953 | Terry | 308—187.1 |
| 2,688,520 | 10/1954 | Covington | 308—187.1 |
| 3,099,543 | 7/1963 | Malmstrom et al. | 165—89 X |

FOREIGN PATENTS 139,013   2/1920   Great Britain.

FREDERICK L. MATTESON, JR., *Primary Examiner.*